United States Patent
Amir et al.

(10) Patent No.: US 11,861,622 B2
(45) Date of Patent: Jan. 2, 2024

(54) METHOD AND SYSTEM OF IDENTIFYING AND REDUCING SCALPING USING DISTRIBUTED LEDGERS

(71) Applicant: MASTERCARD INTERNATIONAL INCORPORATED, Purchase, NY (US)

(72) Inventors: Sharoze Amir, Ballwin, MO (US); Juan Alejandro Gallegos, Omaha, NE (US); Phillip Viana, Austin, TX (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/565,963

(22) Filed: Dec. 30, 2021

(65) Prior Publication Data
US 2023/0230087 A1    Jul. 20, 2023

(51) Int. Cl.
*G06Q 20/40*    (2012.01)

(52) U.S. Cl.
CPC ....... *G06Q 20/4016* (2013.01); *G06Q 20/405* (2013.01); *G06Q 20/407* (2013.01)

(58) Field of Classification Search
None
See application file for complete search history.

(56) References Cited

U.S. PATENT DOCUMENTS

| | | | |
|---|---|---|---|
| 2016/0350547 A1* | 12/2016 | Loughlin-McHugh | ...................... H04L 67/306 |
| 2020/0160352 A1* | 5/2020 | Mehrotra | ............. G06Q 20/202 |
| 2020/0184430 A1* | 6/2020 | Umemoto | ............. H04L 9/0866 |
| 2021/0081850 A1* | 3/2021 | Loredo | ................ G06Q 20/045 |

FOREIGN PATENT DOCUMENTS

WO    WO-2021054989 A1 *    3/2021    ............. G06Q 10/02

* cited by examiner

*Primary Examiner* — Gregory S Cunningham, II
(74) *Attorney, Agent, or Firm* — Panitch Schwarze Belisario & Nadel LLP (57) ABSTRACT

A method for preventing an unauthorized transaction indicative of scalping includes: receiving transaction data for a first payment transaction including one or more product identifiers associated with one or more products purchased in the first payment transaction and consumer identification data; updating a consumer profile based on the one or more product identifiers, wherein the consumer profile is identified using the consumer identification data; receiving a transaction message for a second payment transaction including at least one product identifier included in the one or more product identifiers and at least one consumer data value that is also included in the consumer profile; determining a suspicion score for the consumer profile above a predetermined threshold value; and transmitting an authorization response message for the second payment transaction including a response code indicative of rejection of the second payment transaction.

14 Claims, 6 Drawing Sheets

METHOD AND SYSTEM OF IDENTIFYING AND REDUCING SCALPING USING DISTRIBUTED LEDGERS

FIELD

The present disclosure relates to preventing unauthorized transactions indicative of scalping, specifically the use of cross-merchant coordination and scoring to identify instances of scalping for the prevention of future transactions.

BACKGROUND

Traditionally, scalping has often referred to the resale of tickets for concerts, sports contents, and other events, such as by individuals that have extra tickets they are unable to use and want to recoup costs or make a profit when the demand for attending the event has increased from when the ticket was purchased. In more modern times, thanks to technology, scalping is often accomplished automatically: automated scripts are designed to purchase thousands of tickets for an event the moment they go on sale or purchase hundreds of a product the second it is in stock. These tickets or products are then resold on a secondary market at an increase price for a profit, where the price increase is often the result of a demand that is created because of lack of availability of the tickets or products due to the scalping purchase.

In these cases, a legitimate consumer is forced to either pay the increased price or miss the event, or wait until the product is available again and make another attempt at purchasing. Some merchants have attempted to limit the ability for scalpers to make purchases for resale in an effort to satisfy genuine customers. For instance, captchas are often implemented to limit the ability for purchases to be made automatically and transactions that are conducted faster than possible by a human (e.g., due to automated scripting) are prohibited. However, this does not prevent a person from buying an excess number of tickets or products to resale at a profit for items of increased demand, such as newly released video game consoles or limited manufacture luxury items. In such cases, merchants often limit the number of items that can be purchased in a transaction or even limit the number of items that can be shipped to a specific address. While this can prevent unauthorized purchases at a single merchant, a nefarious actor can purchase from multiple merchants or use multiple payment methods and shipping addresses to avoid such limits.

Thus, there is a need for a technical system that can assist merchants in identifying attempted transactions that are indicative of scalping and that can automatically prevent such purchases in order to provide a more satisfying experience for genuine consumers.

SUMMARY

The present disclosure provides a description of systems and methods for preventing unauthorized transactions indicative of scalping. Transaction data for transactions are stored in a profile for a consumer, where the transactions are tied to the consumer through transaction data, such as shipping address, payment details, device identifier, etc. When a new transaction is received, a score is determined based on the transaction history of the consumer and the details of the new transaction, where the score represents a likelihood that the transaction involves scalping, such as due to repeated purchase of the same item or purchases with the same billing details or shipping address but other purchaser information. If the score is above a threshold, the new transaction is declined due to there being an overwhelming likelihood of scalping. The result is that scalping can be tracked across multiple merchants and in cases where a nefarious actor could traditionally evade detection, due to the tying together of transaction data and scoring thereof. Automatically declining unauthorized transactions as a result can aid merchants in preventing scalping without having to modify existing point of sale systems, providing significant benefit to their genuine consumers.

A method for preventing an unauthorized transaction indicative of scalping includes: receiving, by a receiver of a processing server, transaction data for a first payment transaction, the transaction data including at least one or more product identifiers associated with one or more products purchased in the first payment transaction and consumer identification data; updating, by a processor of the processing server, a consumer profile based on at least the one or more product identifiers, wherein the consumer profile is identified based on at least the consumer identification data; receiving, by the receiver of the processing server, a transaction message for a second payment transaction, wherein the transaction message includes one or more data values including at least one product identifier included in the one or more product identifiers and at least one consumer data value, and wherein the at least one consumer data value is included in the consumer profile; determining, by the processor of the processing server, a suspicion score for the consumer profile, wherein the suspicion score is above a predetermined threshold value; and transmitting, by a transmitter of the processing server, an authorization response message for the second payment transaction, wherein the authorization response message includes a response code indicative of rejection of the second payment transaction.

A system for preventing an unauthorized transaction indicative of scalping includes: a processing server including a receiver receiving transaction data for a first payment transaction, the transaction data including at least one or more product identifiers associated with one or more products purchased in the first payment transaction and consumer identification data, a processor updating a consumer profile based on at least the one or more product identifiers, wherein the consumer profile is identified based on at least the consumer identification data, and a transmitting device, wherein the receiver of the processing server receives a transaction message for a second payment transaction, wherein the transaction message includes one or more data values including at least one product identifier included in the one or more product identifiers and at least one consumer data value, and wherein the at least one consumer data value is included in the consumer profile, the processor of the processing server determines a suspicion score for the consumer profile, wherein the suspicion score is above a predetermined threshold value, and the transmitter of the processing server transmits an authorization response message for the second payment transaction, wherein the authorization response message includes a response code indicative of rejection of the second payment transaction.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Preventing Unauthorized Transactions Indicative of Scalping

Figure 1:
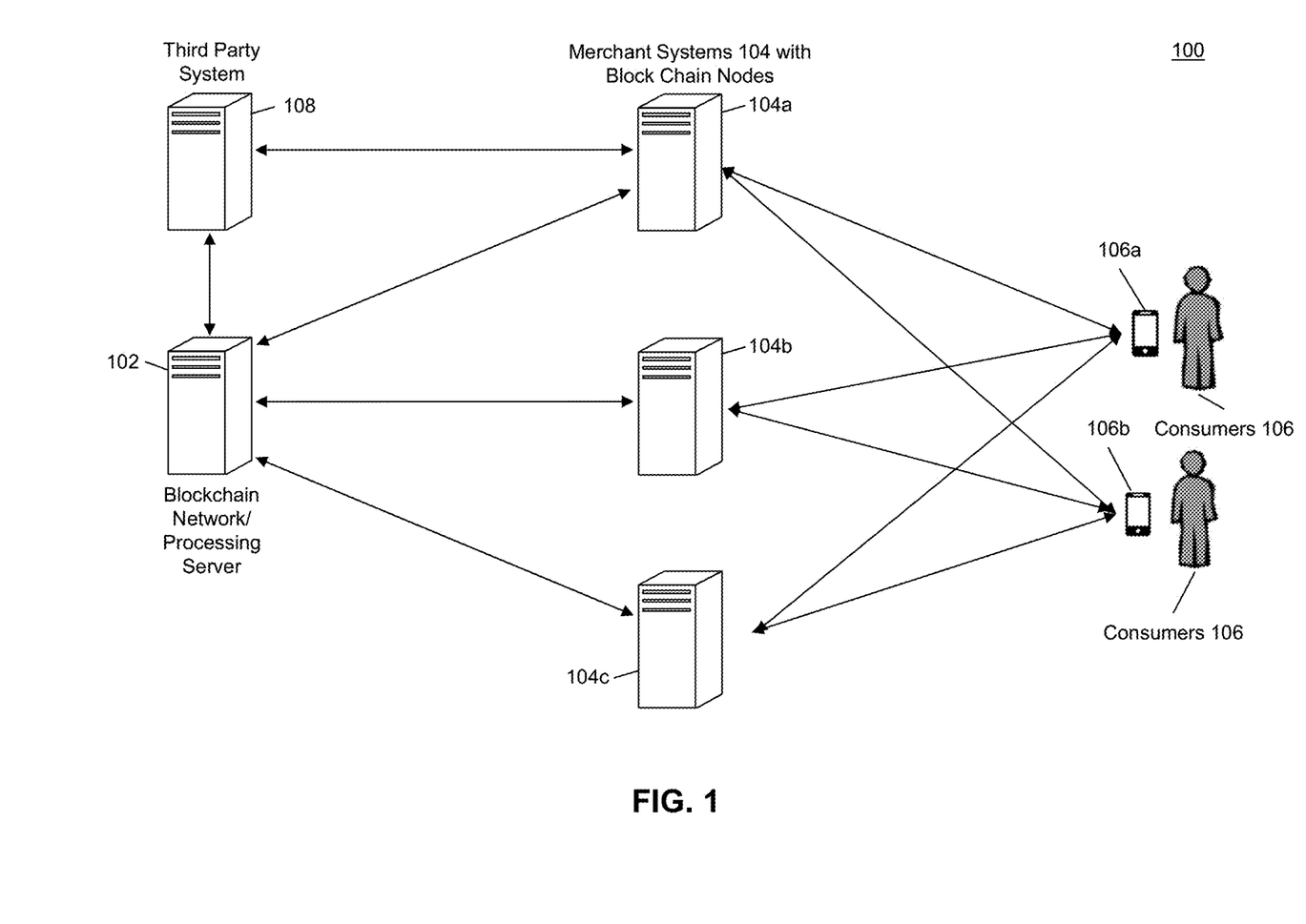
FIG. 1 is a block diagram illustrating a high level system architecture for preventing unauthorized transactions indicative of scalping in accordance with exemplary embodiments.

FIG. 1 illustrates a system 100 that facilitates secure private transfers in a blockchain through the use of privacy groups, smart contracts, and a third party authority.

The system 100 can include a processing server 102. The processing server 102, discussed in more detail below, can be configured to prevent unauthorized transactions, such as those that are indicative of an attempt at scalping. In some embodiments, the processing server 102 can be part of a payment network. A payment network can be a system or network used for the transfer of money via the use of cash-substitutes for thousands, millions, and even billions of transactions during a given period. Payment networks can use a variety of different protocols and procedures in order to process the transfer of money for various types of transactions. Transactions that can be performed via a payment network can include product or service purchases, credit purchases, debit transactions, fund transfers, account withdrawals, etc. Payment networks can be configured to perform transactions via cash-substitutes, which can include payment cards, letters of credit, checks, transaction accounts, etc. Examples of networks or systems configured to perform as payment networks include those operated by Mastercard®, VISA®, Discover®, American Express®, PayPal®, etc. Use of the term "payment network" herein can refer to both the payment network as an entity, and the physical payment network, such as the equipment, hardware, and software comprising the payment network. In other embodiments, the processing server 102 can be external to the payment network and in communication therewith, such as via payment rails of the payment network or another suitable communication method. Payment rails can referred to specialized infrastructure of a payment network used thereby for electronic communications where such communications can be pursuant to specific standards and protocols.

The system 100 can further include a plurality of merchant systems 104, represented in FIG. 1 by three different merchant systems 104 in the system 100, illustrated as merchant systems 104a, 104b, and 104c. Each merchant system 104 can be configured to participant in electronic payment transactions, such as with a consumer 106 that purchases one or more goods or services from a merchant associated with the merchant system 104. As used herein "merchant system" can refer to the merchant itself or to one or more computing systems, such as a point of sale system, utilized by the merchant in conducting electronic payment transactions with one or more consumers 106. As discussed herein, a "payment transaction" can be a transaction between two entities in which money or other financial benefit is exchanged from one entity to the other. The payment transaction can be a transfer of funds, for the purchase of goods or services, for the repayment of debt, or for any other exchange of financial benefit as will be apparent to persons having skill in the relevant art. In some instances, payment transaction can refer to transactions funded via a payment card and/or payment account, such as credit card transactions. Such payment transactions can be processed via an issuer, payment network, and acquirer. The process for processing such a payment transaction can include at least one of authorization, batching, clearing, settlement, and funding. Authorization can include the furnishing of payment details by the consumer to a merchant, the submitting of transaction details (e.g., including the payment details) from the merchant to their acquirer, and the verification of payment details with the issuer of the consumer's payment account used to fund the transaction. Batching can refer to the storing of an authorized transaction in a batch with other authorized transactions for distribution to an acquirer. Clearing can include the sending of batched transactions from the acquirer to a payment network for processing. Settlement can include the debiting of the issuer by the payment network for transactions involving beneficiaries of the issuer. In some instances, the issuer can pay the acquirer via the payment network. In other instances, the issuer can pay the acquirer directly. Funding can include payment to the merchant from the acquirer for the payment transactions that have been cleared and settled. It will be apparent to persons having skill in the relevant art that the order and/or categorization of the steps discussed above performed as part of payment transaction processing. As discussed herein "issuer" can refer to a financial institution or other entity that issues a transaction account to a consumer 106 for funding electronic payment transactions, and "acquirer" can refer to a financial institution or other entity that issues a transaction account to a merchant system 104 for use in receiving funds as part of an electronic payment transaction.

In the system 100, a consumer 106 can participate in a payment transaction with a merchant system 104. As part of the payment transaction, the consumer 106 can provide payment details associated with a transaction account for use in funding the payment transaction, such as via a payment card, credit card, or other suitable payment method. The payment details can be included in a transaction message along with other transaction data for the attempted payment transaction. A transaction message can be a data message that is specially formatted pursuant to one or more standards governing the exchange of financial transaction messages, such as the International Organization of Standardization's ISO 8583 or ISO 20022 standards. A transaction message can include a message type indicator indicative of a type of message and one or more data values, where each data value is configured to store data according to the applicable standard(s).

In a standard payment transaction, the merchant system 104 can generate a transaction message that includes a message type indicator indicative of an authorization request for the payment transaction. The data values included in the authorization request can store any transaction data suitable for use in processing the payment transaction and performing the functions discussed herein. Such transaction data can include, for example, a merchant identifier, merchant name, transaction time, transaction date, geographic location, point of sale identifier, currency type, transaction type, payment method, payment details (e.g., transaction account number, name, expiration date, security code, billing address, etc.), shipping address, product data (e.g., product identifiers, quantities, serial numbers, etc.), coupon data, offer data, loyalty data, reward data, etc.

The authorization request is electronically submitted to a payment using payment rails associated therewith directly by the merchant system 104 or via one or more intermediary systems, such as an acquiring institution. The payment network can receive the authorization request and route the authorization request to an issuing financial institution that issued the transaction account used to pay for the payment transaction based on the payment details included in the authorization request. The issuing institution can approve or deny the payment transaction and return a response indicating the approval or denial to the payment network. A transaction message that includes a message type indicator indicative of an authorization response is returned to the merchant system 104 (e.g., directly or via an intermediary system) where a data element included therein stores a response code indicating the approval or decline (e.g., and a reason for the decline) of the payment transaction. The merchant system 104 can then finalize the payment transaction, such as by providing the purchased goods or services to the consumer 106 if the payment transaction was approved.

In the system 100, the processing server 102 can be configured to assist the merchant systems 104 in the detection of attempts at scalping by consumers 106 and in the prevention of transactions that have a likelihood of scalping. To assist merchant systems 104, the processing server 102 can collect transaction data for any payment transactions involving a consumer 106 and store the transaction data in a profile associated with the consumer 106 in a storage of the processing server 102 or otherwise accessible thereby. In embodiments where the processing server 102 is a part of a payment network, the processing server 102 can receive transaction messages for payment transaction during the processing thereof and parse transaction data from the received transaction messages. In some embodiments, merchant systems 104 can register with the processing server 102 for services via the functions discussed herein where, as part of the participation of the merchant system 104, the merchant system 104 can submit transaction data for payment transactions in which the merchant system 104 is a participant.

When the processing server 102 receives transaction data for a payment transaction, the processing server 102 can use consumer identification data included therein to match the transaction data to an established consumer profile. If no consumer profile is identified that is a match with the consumer identification data, a new consumer profile can be generated by the processing server 102. A match can be made using one or more pieces of consumer identification data. For instance, a transaction message can include a payment account number, cardholder name, shipping address, and billing address, where each of these data items can be considered consumer identification and used to match received transaction data with a consumer profile. In cases where the payment transaction is an electronic commerce transaction, the transaction data can include additional consumer identification data, such as a media access control (MAC) address, serial number, Internet Protocol (IP) address, or other data associated with the device used to participate in the electronic commerce transaction, or other additional data that can be submitted by the consumer 106 as part of the payment transaction, such as an e-mail address.

The processing server 102 can receive transaction data for one or more payment transactions involving a consumer 106 from each of a plurality of different merchant systems 104. The processing server 102 can match all of the transaction data to the consumer 106 using the consumer identification data and build a profile of the consumer's transaction behavior as a result. The processing server 102 can analyze the historical transaction data for a consumer 106 and generate a score where the score is indicative of the likelihood that the consumer 106 is participating in scalping. In some cases, the processing server 102 generate the score separate from a payment transaction. In some instances, the processing server 102 can receive an authorization request for a newly attempted payment transaction involving the consumer 106 or transaction data included therein and generate a score indicative of the likelihood that the attempted payment transaction involves scalping, which can be based on a score generated for the consumer profile prior to the transaction or can be based on analysis of the historical transaction data combined with the transaction data for the attempted payment transaction. The score can be represented on any scale that can be suitable for performing the functions discussed herein, such as a numerical scale (e.g., 0 to 100).

In some embodiments, the processing server 102 can report scores for attempted payment transactions to the merchant system 104 or other entity involved in the payment transaction (e.g., an acquirer, issuer, etc.) and the merchant system 104 or other entity can decide to proceed or halt the payment transaction as a result. For instance, each merchant system 104 or other entity can have its own score threshold value where a scalping score above the threshold level can result in automatic decline of the payment transaction. In other embodiments, the processing server 102 can determine whether or not to decline the payment transaction on behalf of a merchant system 104 because of the score. For instance, the processing server 102 can have a threshold value (e.g., for all transactions or a merchant-specific threshold value) where, if the generated score is above the threshold value, the processing server 102 can generate an authorization response that includes a response code declining the payment transaction and return the authorization response to the merchant system 104. If the score is below the threshold value, the authorization request can be routed to an issuing financial institution or other entity for processing using standard practices.

In an example implementation, in the system 100 each of the merchant systems 104a, 104b, and 104c can sell a new gaming console and set a limit on purchases thereof to two per household. A consumer 106 can visit the merchant system 104 to initiate a first transaction of two consoles from the merchant system 104a. The authorization request for the first transaction can be routed to the processing server 102.

The processing server 102 can use the consumer identification included therein to try and identify a consumer profile for the consumer 106. The processing server 102 can then generate a score for the first transaction based on the consumer profile and the transaction data for the first transaction. If there is no record of the consumer 106 having purchased the console previously from any merchant, the processing server 102 can generate a low score (e.g., 0 if there is no indication of scalping, 15 if the consumer 106 has a past history indicating the consumer 106 can have made purchases for resale previously, etc.). The score can be below a threshold value set by the merchant system 104a (e.g., 65) and so the processing server 102 can forward the authorization request to the issuer for the consumer's transaction account for standard processing.

Following the first transaction and the consumer's successful purchase of two consoles, the consumer 106 can visit the merchant system 104b for the purchase of one console. The merchant system 104b can submit an authorization request for this second payment transaction to the processing server 102. The processing server 102 can receive the authorization request and identify the consumer profile for the consumer 106 again (e.g., matching the shipping address even if a different payment method was provided). The processing server 102 can generate a score for the second payment transaction, which can be higher than the score generated for the first transaction due to the consumer 106 visiting a second merchant system 104b after already purchasing the two console limit from the first merchant system 104a. For instance, the processing server 102 can generate a score of 45 because of the purchase of a third console, which can indicate scalping, but can be limited because the consumer 106 is only purchasing one from the merchant system 104b instead of the allowed limit of two. The processing server 102 can compare the generated score with the threshold value set by the merchant system 104b (e.g., 70) and then, because the score is below the threshold value, forward the authorization request to the issuer for the consumer's transaction account for standard processing.

After the second payment transaction, the consumer 106 can visit the merchant system 104c for the purchase of two more consoles. The merchant system 104c can submit an authorization request for this third attempted payment transaction to the processing server 102. The processing server 102 can receive the authorization request and identify the consumer profile for the consumer 106 once more (e.g., matching an e-mail address for the receipt even if a new shipping address was provided). The processing server 102 can generate a score for the third payment transaction, which can be significantly higher than the first two scores because of the significantly higher likelihood that the consumer 106 is attempting to purchase the consoles for scalping. The processing server 102 can generate a score of 80 for the third payment transaction and then compare the score with a threshold value associated with the merchant system 104c (e.g., 55). Because the score is above the threshold value, the processing server 102 can generate an authorization response for the third payment transaction that includes a response code declining the payment transaction and forward the authorization response back to the merchant system 104c. The merchant system 104c can then halt the third payment transaction and retain the two consoles for a different consumer 106 with a better score.

In traditional systems, the consumer 106 could successfully purchase all five consoles, even in cases where the merchant systems 104 share some consumer information, such as shipping addresses or e-mail addresses, because the consumer 106 did not provide consistent information to all three merchant systems 104. In the system 100, the processing server 102 matched the purchases using the consumer identification data and was able to provide the merchant system 104c with a score to enable the merchant system 104c to stop the purchase of the additional consoles. As a result, the consumer 106 can be prevented from scalping the two extra consoles and two other genuine consumers 106 can purchase a console where they would have been unable to in a traditional system. Additionally, because the processing server 102 performs the functions discussed herein using transaction data, which can be parsed directly from transaction messages that the processing server 102 can receive using payment rails, the methods and systems discussed herein can be implemented without any modification to merchant systems 104 that include blockchain nodes 104a, 104b, 104c, etc., thus providing a valuable service for merchants and consumers 106 with the greatest convenience.

In some embodiments, the system 100 can include a third party system 108. The third party system 108 can be any additional entity that has an interest in participating in the system 100 to assist in the prevention of scalping. For example, the third party system 108 can be resale market that provides the processing server 102 with data on scalpers that use the platform for inputting into consumer profiles in order to help prevent additional purchases by nefarious consumers 106. In another example, the third party system 108 can be a company that collects transaction data for payment transactions on behalf of merchant systems 104 and provides the transaction data to the processing server 102, such as to protect the identity of merchant systems 104 or redact potentially personally identifiable information as necessary to comply with any rules or regulations. In such an example, the processing server 102 can operate and assist merchant systems 104 without the merchant systems 104 having to directly provide any data to the processing server 102. In yet another example, the third party system 108 could provide a service to consumers 106 purchasing secondhand items using a web page or application program. A consumer 106 through a participant system 106a or 106b can contact the third party system 108 and provide information regarding a reseller with whom the consumer 106 is interested in purchasing the secondhand item. The third party system 108 can provide the information to the processing server 102, which can generate a score for the reseller and/or the potential transaction and provide the score to the third party system 108, which can assist the consumer 106 in determining whether or not to move forward with the transaction. For instance, the consumer 106 can refuse to purchase the item from a scalper to help discourage engagement of nefarious actors in scalping.

Figure 2:
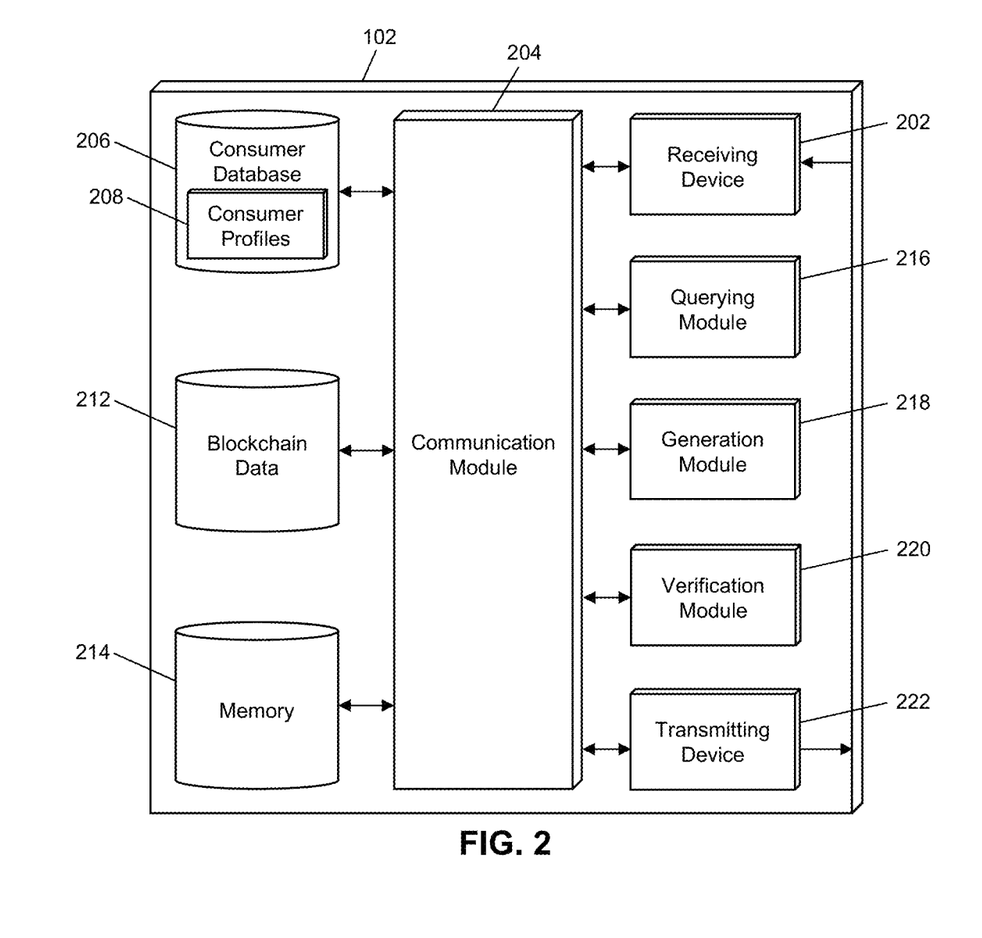
FIG. 2 is a block diagram illustrating a processing server for preventing unauthorized transactions indicative of scalping in the system of FIG. 1 in accordance with exemplary embodiments.
Figure 6:
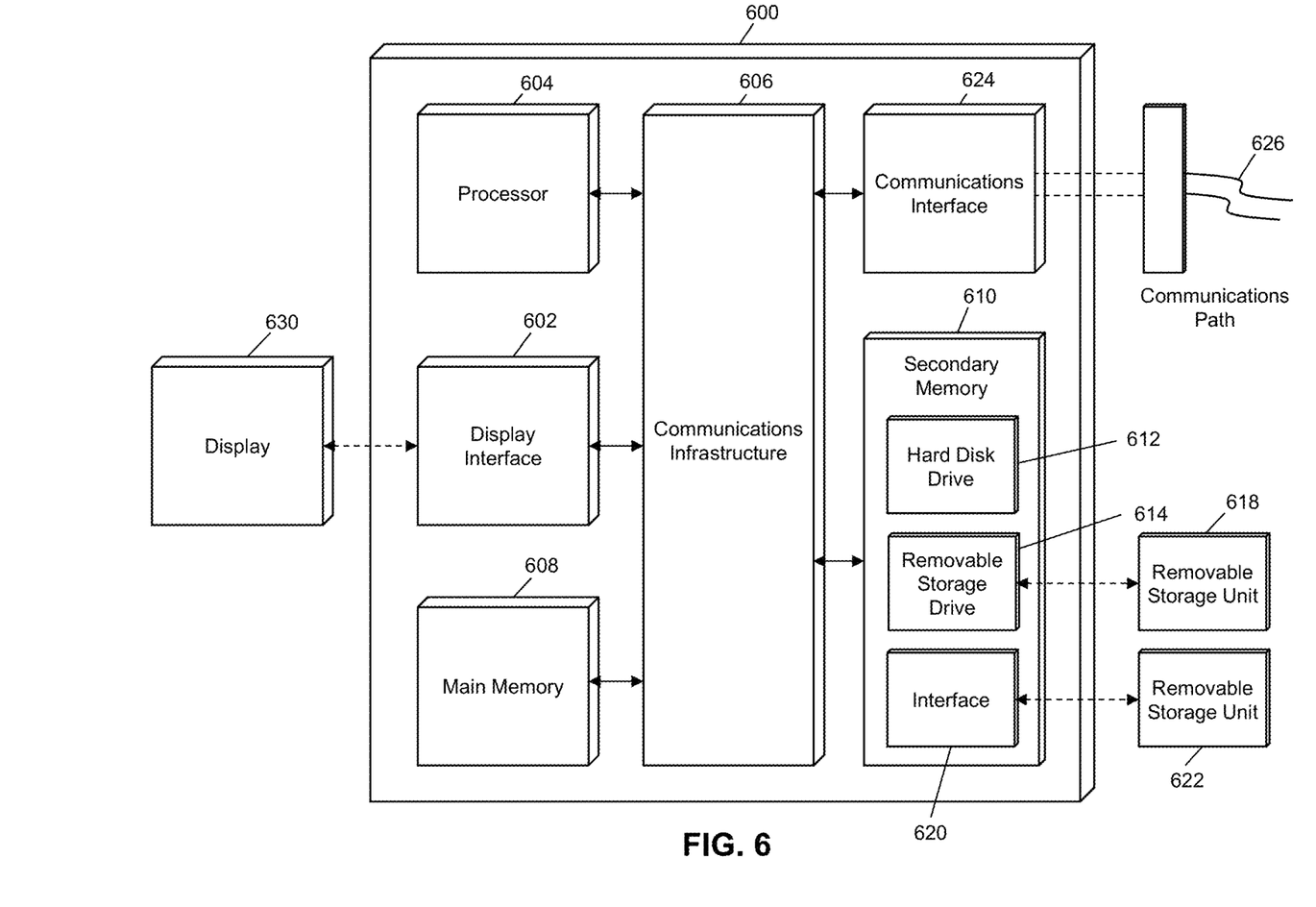
FIG. 6 is a block diagram illustrating a computer system architecture in accordance with exemplary embodiments.

In some embodiments, the system 100 can utilize a blockchain. In such embodiments, the system 100 can include a blockchain network. The blockchain network can be comprised of a plurality of blockchain nodes. Each blockchain node can be a computing system, such as illustrated in FIG. 2 or 6, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain can be a distributed ledger that is comprised of at least a plurality of blocks. Each block can include at least a block header and one or more data values.

Each block header can include at least a timestamp, a block reference value, and a data reference value. The timestamp can be a time at which the block header was generated, and can be represented using any suitable method (e.g., UNIX timestamp, DateTime, etc.). The block reference value can be a value that references an earlier block (e.g., based on timestamp) in the blockchain. In some embodiments, a block reference value in a block header can be a reference to the block header of the most recently added block prior to the respective block. In an exemplary embodiment, the block reference value can be a hash value generated via the hashing of the block header of the most recently added block. The data reference value can similarly be a reference to the one or more data values stored in the block that includes the block header. In an exemplary embodiment, the data reference value can be a hash value generated via the hashing of the one or more data values. For instance, the block reference value can be the root of a Merkle tree generated using the one or more data values.

The use of the block reference value and data reference value in each block header can result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node in the blockchain network prior to the generation and addition of a new block to the blockchain in order for the change to be made permanent. Computational and communication limitations can make such a modification exceedingly difficult, if not impossible, thus rendering the blockchain immutable.

In some embodiments, the blockchain can be used to store information regarding blockchain transactions conducted between two different blockchain wallets. A blockchain wallet can include a private key of a cryptographic key pair that is used to generate digital signatures that serve as authorization by a payer for a blockchain transaction, where the digital signature can be verified by the blockchain network 108 using the public key of the cryptographic key pair. In some cases, the term "blockchain wallet" can refer specifically to the private key. In other cases, the term "blockchain wallet" can refer to a computing device (e.g., participant system 106a or 106b, etc.) that stores the private key for use thereof in blockchain transactions. For instance, each computing device can each have their own private key for respective cryptographic key pairs, and can each be a blockchain wallet for use in transactions with the blockchain associated with the blockchain network. Computing devices can be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain can correspond to a blockchain transaction or other storage of data, as applicable. A blockchain transaction can consist of at least: a digital signature of the sender of currency (e.g., a first participant system 106a) that is generated using the sender's private key, a blockchain address of the recipient of currency (e.g., a second participant system 106b) generated using the recipient's public key, and a blockchain currency amount that is transferred or other data being stored. In some blockchain transactions, the transaction can also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction can also include the sender's public key, for use by an entity in validating the transaction. For the traditional processing of a blockchain transaction, such data can be provided to a blockchain node 104 in the blockchain network 102, either by the sender or the recipient. The node can verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block can be validated by other nodes in the blockchain network 102 before being added to the blockchain and distributed to all of the blockchain nodes 104 in the blockchain network 102, respectively, in traditional blockchain implementations. In cases where a blockchain data value cannot be related to a blockchain transaction, but instead the storage of other types of data, blockchain data values can still include or otherwise involve the validation of a digital signature.

In the system 100, the blockchain can be configured to store the collected transaction data for consumer profiles. In such embodiments, the consumer identification data can be removed, encrypted, hashed, or otherwise prevented from being stored in an accessible manner in the blockchain to protect the privacy of consumers 106. A blockchain data entry in the blockchain can include transaction data for a payment transaction involving a merchant system 104 and a consumer 106 that is matched to a consumer 106 with an identification value associated therewith (e.g., an identification number, a public key, etc.) also included in the blockchain data entry. When a score is to be generated, the processing server 102 can identify all blockchain data entries that includes the identification value associated with the consumer 106 attempting a new transaction and generate the score based on the transaction data stored in the identified blockchain data entries. Use of the blockchain can prevent an entity from modifying the transaction data to hide behavior that could prevent future transactions due to scalping. Additionally, the blockchain can be made public to provide transparency. Furthermore, use of a blockchain, which is decentralized, can provide for greater convenience in implementations where multiple processing servers 102 can be used. For instance, the functions of the processing server 102 can be performed by on-site interface processors at merchant systems 104 using the blockchain, which can have transactions approved or declined with respect to scalping before an authorization request is ever submitted to a payment network, which can reduce bandwidth and improve transaction speeds.

In some such embodiments, the blockchain can utilize smart contracts to perform one or more of the functions discussed herein. A smart contract can be a self-executable data object that is stored on the blockchain in a blockchain data value that executes once one or more criteria have been satisfied. In an example, when an authorization request for a new transaction is received, the transaction data for the transaction can be provided as input to a smart contract stored on the blockchain. The smart contract could determine the suspicion score for the transaction based on the received transaction data and additional data identified by the smart contract (e.g., past transaction history of the consumer 106 identified using consumer identification in the authorization request) and provide an approval or rejection of the authorization request accordingly. In some cases, the authorization request and the result of the execution of the smart contract can both be stored in new blockchain data entries in the blockchain.

Processing Server

FIG. 2 illustrates an embodiment of a processing server 102. It will be apparent to persons having skill in the relevant art that the embodiment of the processing server 102 illustrated in FIG. 2 is provided as illustration only and cannot be exhaustive to all possible configurations of the processing server 102 suitable for performing the functions as discussed herein. For example, the computer system 600 illustrated in FIG. 6 and discussed in more detail below can be a suitable configuration of the processing server 102. In some cases, additional components of the system 100, such as the merchant systems 104 and third party system 108 can include the components illustrated in FIG. 2 and discussed below.

The processing server 102 can include a receiving device 202. The receiving device 202 can be configured to receive data over one or more networks via one or more network protocols. In some instances, the receiving device 202 can be configured to receive data from merchant systems 104, third party systems 108, payment networks, blockchain nodes, financial institutions, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by merchant systems 104 directly thereby or via one or more intermediary systems, which can be superimposed or otherwise encoded with transaction messages or other data messages that include transaction data. The receiving device 202 can also be configured to receive data signals from third party systems 108 or other entities that can be superimposed or otherwise encoded with requests for scalping scores, transaction data, consumer identification data, etc. The receiving device 202 can be further configured to receive data signals electronically transmitted by nodes in a blockchain network, which can be superimposed or otherwise encoded with blockchain data, such as blocks or blockchain data values stored therein.

The processing server 102 can also include a communication module 204. The communication module 204 can be configured to transmit data between modules, engines, databases, memories, and other components of the processing server 102 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the processing server 102 and external components of the processing server 102, such as externally connected databases, display devices, input devices, etc. The processing server 102 can also include a processing device. The processing device can be configured to perform the functions of the processing server 102 discussed herein as will be apparent to persons having skill in the relevant art. In some embodiments, the processing device can include and/or be comprised of a plurality of engines and/or modules specially configured to perform one or more functions of the processing device, such as a querying module 216, generation module 218, verification module 220, etc. As used herein, the term "module" can be software or hardware particularly programmed to receive an input, perform one or more processes using the input, and provides an output. The input, output, and processes performed by various modules will be apparent to one skilled in the art based upon the present disclosure.

The processing server 102 can include a consumer database 206. The consumer database 206 can be configured to store a plurality of consumer profiles 208 using a suitable data storage format and schema. The consumer database 206 can be a relational database that utilizes structured query language for the storage, identification, modifying, updating, accessing, etc. of structured data sets stored therein. Each consumer profile 208 can be a structured data set configured to store data related to a consumer 106. A consumer profile 208 can include, for example, consumer identification data, transaction data for a plurality of different payment transactions involving the associated consumer 106 and one or more merchant systems 104, score history, etc.

The processing server 102 can also include a memory 214. The memory 214 can be configured to store data for use by the processing server 102 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the processing server 102 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein. The memory 214 can be configured to store, for example, cryptographic keys, cryptographic key pairs, cryptographic algorithms, encryption algorithms, communication information, data formatting rules, transaction processing rules, transaction message standards, transaction message routing rules, merchant data, score threshold values, etc. Likewise, given the processing server 102 can act as a blockchain node, under such circumstances it can have a memory for blockchain data 212.

The processing server 102 can include a querying module 216. The querying module 216 can be configured to execute queries on databases to identify information. The querying module 216 can receive one or more data values or query strings, and can execute a query string based thereon on an indicated database, such as the group database 206 of the processing server 102 to identify information stored therein. The querying module 216 can then output the identified information to an appropriate engine or module of the processing server 102 as necessary. The querying module 216 can, for example, execute a query on the consumer database 206 to identify a consumer profile 208 corresponding to a received transaction message for use of the transaction data stored therein for the generation of a score.

The processing server 102 can also include a generation module 218. The generation module 218 can be configured to generate data for use by the processing server 102 in performing the functions discussed herein. The generation module 218 can receive instructions as input, can generate data based on the instructions, and can output the generated data to one or more modules of the processing server 102. For example, the generation module 218 can be configured to generate scores indicative of a likelihood of scalping for a consumer profile 208 or a transaction based on analysis of historical transaction data for a plurality of payment transactions involving a consumer 106 matched using consumer identification values. The generation module 218 can be further configured to generate other data for use in performing the functions discussed herein, such as transaction messages including authorization responses, blockchain data, notification messages, etc.

The processing server 102 can also include a verification module 220. The verification module 220 can be configured to perform verifications for the processing server 102 as part of the functions discussed herein. The verification module 220 can receive instructions as input, which can also include data to be used in performing a verification, can perform a verification as requested, and can output a result of the verification to another module or engine of the processing server 102. The verification module 220 can, for example, be configured to verify consumer identification data, verify generated scores, verify transaction data, etc.

The processing server 102 can also include a transmitting device 222. The transmitting device 222 can be configured to transmit data over one or more networks via one or more network protocols. In some instances, the transmitting device 222 can be configured to transmit data to merchant systems 104, third party systems 108, payment networks, financial institutions, nodes in blockchain networks, and other entities via one or more communication methods, local area networks, wireless area networks, cellular communication, Bluetooth, radio frequency, the Internet, etc. In some embodiments, the transmitting device 222 can be comprised of multiple devices, such as different transmitting devices for transmitting data over different networks, such as a first transmitting device for transmitting data over a local area network and a second transmitting device for transmitting data via the Internet. The transmitting device 222 can electronically transmit data signals that have data superimposed that can be parsed by a receiving computing device. In some instances, the transmitting device 222 can include one or more modules for superimposing, encoding, or otherwise formatting data into data signals suitable for transmission.

The transmitting device 222 can be configured to electronically transmit data signals to merchant systems 104 that can be superimposed or otherwise encoded with scalping scores, requests for transaction data, transaction messages, etc. The transmitting device 222 can also be configured to electronically transmit data signals to financial institutions and other entities participating in electronic payment transactions, which can be superimposed or otherwise encoded with transaction messages, scalping scores, etc. The transmitting device 222 can be further configured to electronically transmit data signals to nodes in blockchain networks that can be superimposed or otherwise encoded with blockchain data values, requests for blockchain data, etc.

Process for Collecting Transaction Data

Figure 3:
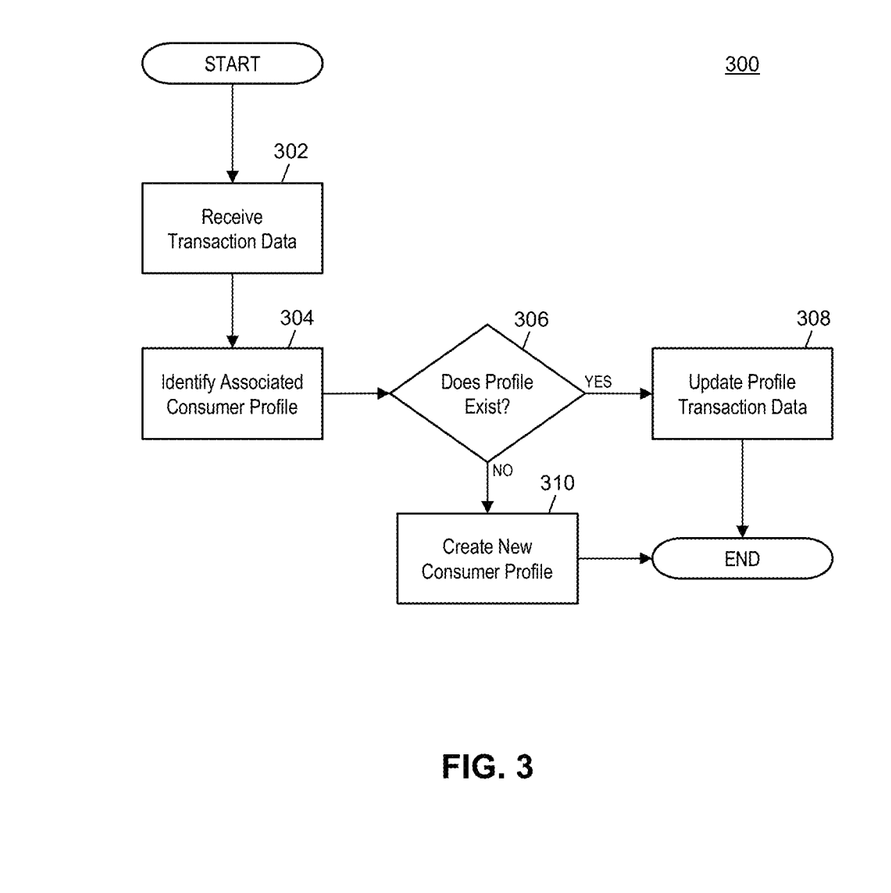
FIG. 3 is a flow diagram illustrating a process for collecting transaction data for use in preventing transactions indicative of scalping as performed by the processing server in the system of FIG. 1 in accordance with exemplary embodiments.

FIG. 3 illustrates a process 300 for collecting transaction data for use in preventing scalping as performed by the processing server 102 of the system 100 of FIG. 1 and of FIG. 2.

In step 302, the receiving device 202 of the processing server 102 can receive transaction data for a processed payment transaction. The transaction data can be included in a transaction message, which can be received during the processing of the payment transaction (e.g., an authorization response before being forwarded to a merchant system 104) or after the payment transaction has been processed (e.g., as provided by a merchant system 104 after finalizing the payment transaction with the consumer 106). In step 304, the querying module 216 of the processing server 102 can execute a query on the consumer database 206 of the processing server 102 to attempt to identify a consumer profile 208 that includes one or more consumer identification values that are included in the received transaction data for the payment transaction. In step 306, the processing server 102 can determine if a consumer profile 208 already exists that includes at least one of the one or more consumer identification values.

If no consumer profile 208 exists that includes a match with anything in the transaction data, then, in step 310, the querying module 216 of the processing server 102 can execute another query on the consumer database 206 to insert a new consumer profile 208 into the consumer database 206 that includes the received transaction data. If a consumer profile 208 is successfully identified in step 306, then, in step 308, the querying module 216 of the processing server 102 can execute another query on the consumer database 206 to update the identified consumer profile 208 to add the received transaction data. In cases where, in step 306, the processing server 102 identifies multiple consumer profiles 208, the processing server 102 can select one of the consumer profiles 208 for use in step 308 using any suitable criteria (e.g., match priorities for consumer identification values) or, in some instances, can merge the consumer profiles 208 during step 308. The result of the process 300 is that consumer profiles 208 are kept up to date with consumer transaction data for use in making determinations regarding attempted scalping transactions, such as illustrated in process 400 in FIG. 4 and discussed below.

Process for Scoring Initiated Transactions for Scalping

Figure 4:
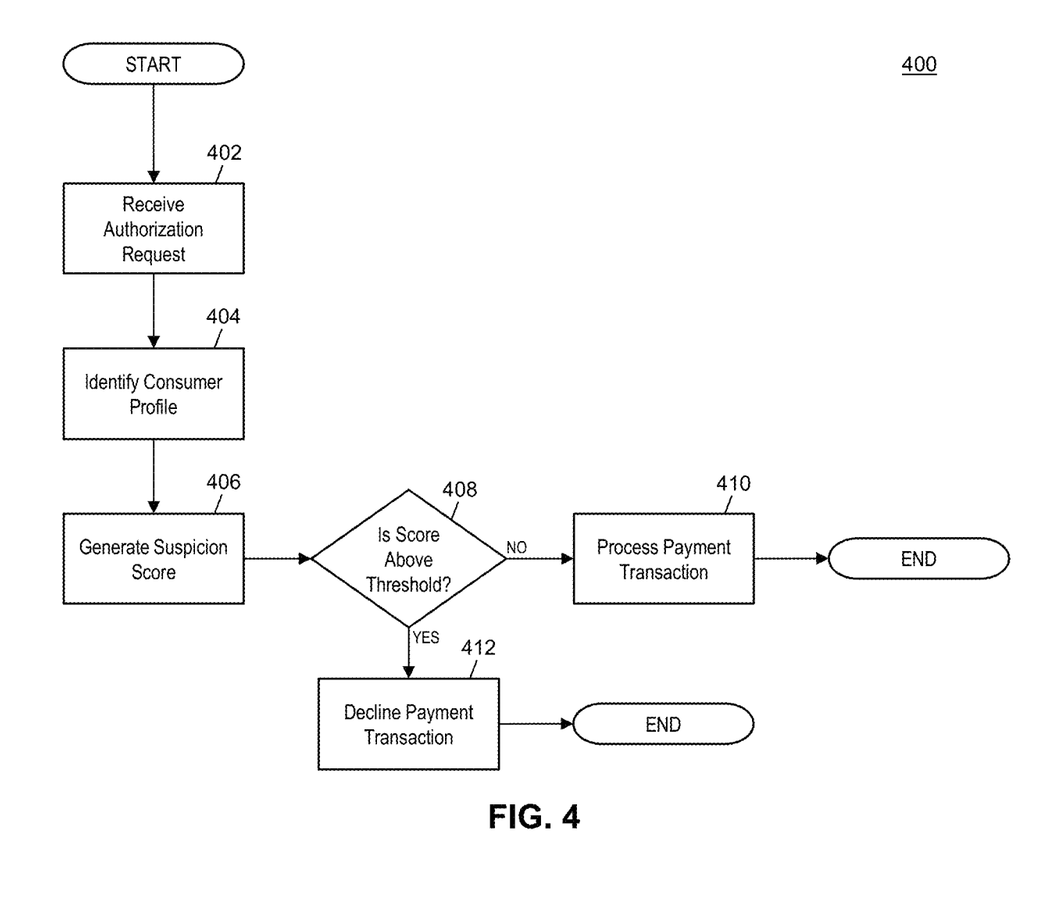
FIG. 4 is a flow diagram illustrating a process for scoring an initiated transaction for likelihood of scalping as performed by the processing server in the system of FIG. 1 in accordance with exemplary embodiments.

FIG. 4 illustrates a process for scoring an initiated payment transaction for likelihood of scalping as performed by the processing server 102 of the system 100 of FIGS. 1 and 2.

In step 402, the receiving device 202 of the processing server 102 can receive an authorization request for a payment transaction that has been initiated by a consumer 106 at a merchant system 104. In an example, the merchant system 104 can submit an authorization request to a payment network via payment rails associated therewith, where, as part of processing, the payment network can provide the authorization request to the processing server 102 for scoring thereof as part of a scalping prevention service. In step 404, the querying module 216 of the processing server 102 can execute a query on the consumer database 206 of the processing server 102 to identify a consumer profile 208 that includes one or more consumer identification values that match consumer identification values included in the received authorization request.

In step 406, the generation module 218 of the processing server 102 can generate a suspicion score for the initiated payment transaction based on transaction data included in the consumer profile 208 identified in step 404 as well as transaction data included in the received authorization request. The suspicion score can represent a likelihood that the transaction is an attempt at scalping, such as due to repeated purchases of a high-demand or limited-availability item, attempted evasions at having repeated transactions detected, etc. In step 408, the processing server 102 can determine if the generated suspicion score is above a threshold value, which can be set by the processing server 102 or by the merchant system 104 that submitted the authorization request.

If the suspicion score is below the threshold value, then, in step 410, the transmitting device 222 of the processing server 102 can forward the authorization request to an issuing financial institution that issued the transaction account used to fund the initiated payment transaction by the consumer 106, which can be identified using transaction data included in the authorization request, such as a bank identification number included in a transaction account number stored in an appropriate data element in the authorization request. If the suspicion score is above the threshold value, then, in step 412, the generation module 218 of the processing server 102 can generate an authorization response for the initiated payment transaction that includes a response code indicative of a decline of the payment transaction. The transmitting device 222 of the processing server 102 can then electronically transmit the authorization response to the merchant system 104 using payment rails associated with the payment network, where the merchant system 104 can then prevent the purchase due to the unacceptable likelihood of scalping.

Exemplary Method for Preventing Unauthorized Transactions

Figure 5:
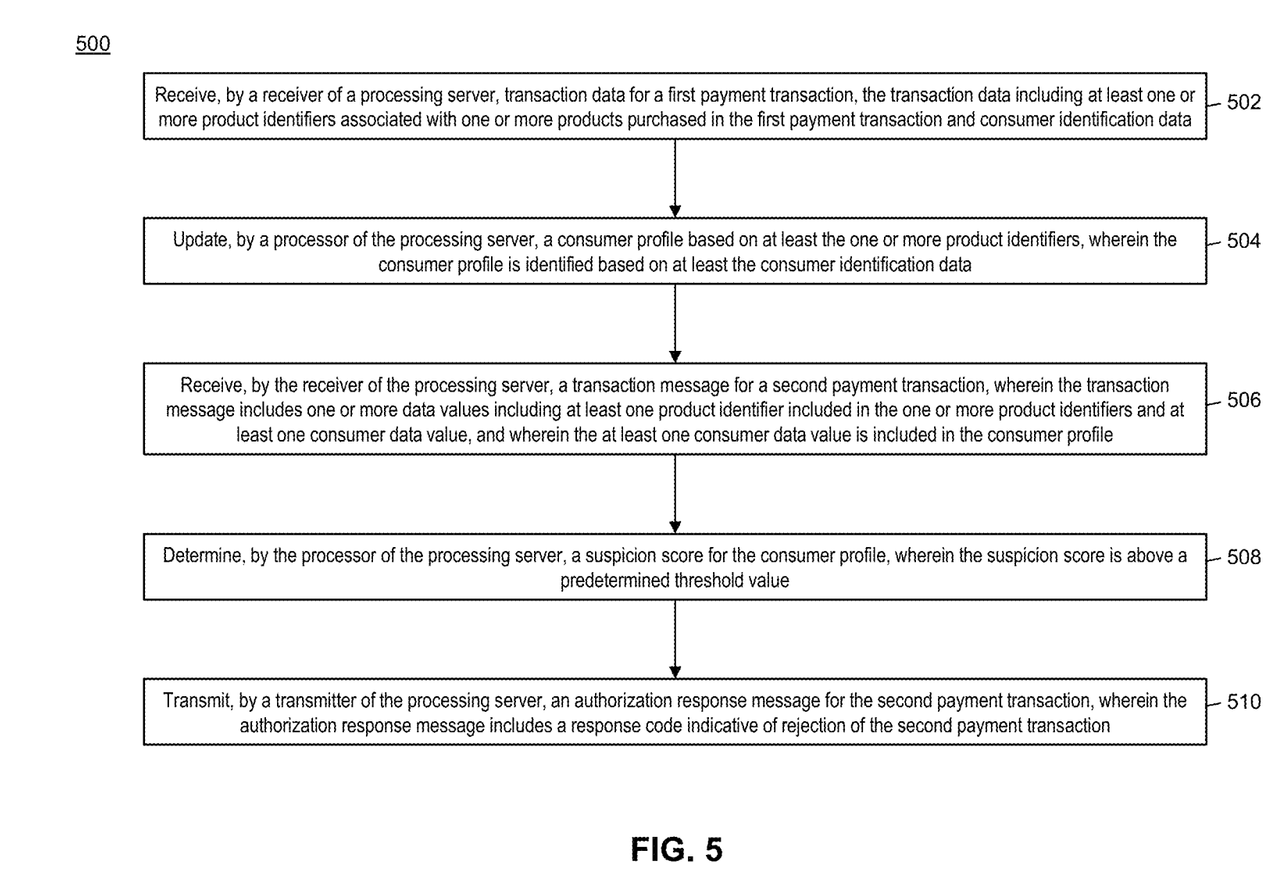
FIG. 5 is a flow chart illustrating an exemplary method for preventing unauthorized transactions indicative of scalping in accordance with exemplary embodiments.

FIG. 5 illustrates a method 500 for preventing an unauthorized transaction that is indicative of an attempt at scalping based on historical transaction data.

In step 502, transaction data for a first payment transaction can be received by a receiver (e.g., receiving device 202) of a processing server (e.g., processing server 102), the transaction data including at least one or more product identifiers associated with one or more products purchased in the first payment transaction and consumer identification data. In step 504, a consumer profile (e.g., consumer profile 208) can be updated by a processor (e.g., querying module 216) of the processing server based on at least the one or more product identifiers, wherein the consumer profile is identified based on at least the consumer identification data.

In step 506, a transaction message for a second payment transaction can be received by the receiver of the processing server, wherein the transaction message includes one or more data values including at least one product identifier included in the one or more product identifiers and at least one consumer data value, and wherein the at least one consumer data value is included in the consumer profile. In step 508, a suspicion score can be determined by the processor (e.g., generation module 218) of the processing server for the consumer profile, wherein the suspicion score is above a predetermined threshold value. In step 510, an authorization response message can be transmitted by a transmitter (e.g., transmitting device 222) of the processing server for the second payment transaction, wherein the authorization response message includes a response code indicative of rejection of the second payment transaction.

In one embodiment, the transaction message can be transmitted via payment rails. In some embodiments, the transaction message can be formatted according to one or more standards, and the one or more data values can be stored in a plurality of data fields included in the transaction message and specified in the one or more standards. In one embodiment, the transaction message can be received from an external computing system (e.g., merchant system 104), and the authorization response can be transmitted to the external computing system.

In some embodiments, the consumer profile can be stored on a blockchain, and updating the consumer profile can comprise generating a new block for the blockchain that includes a blockchain data entry including at least the one or more product identifiers and a public key of a cryptographic key pair associated with the consumer profile. In one embodiment, the suspicion score can be indicative of a likelihood of the second payment transaction purchasing a product associated with the one or more product identifiers for scalping. In some embodiments, the suspicion score can be based on a number of product identifiers stored in the consumer profile compared to a predetermined value. In one embodiment, the first payment transaction can involve a first merchant (e.g., merchant system 104a) of a plurality of merchants, the second payment transaction can involve a second merchant (e.g., merchant system 104b) of the plurality of merchants, and the first merchant can be different from the second merchant.

Computer System Architecture

FIG. 6 illustrates a computer system 600 in which embodiments of the present disclosure, or portions thereof, can be implemented as computer-readable code. For example, the processing server 102 of FIGS. 1 and 2 and the merchant systems 104 and third party system 108 of FIG. 1 can be implemented in the computer system 600 using hardware, non-transitory computer readable media having instructions stored thereon, or a combination thereof and can be implemented in one or more computer systems or other processing systems. Hardware can embody modules and components used to implement the methods of FIGS. 3-5.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 604 can be a special purpose or a general purpose processor device specifically configured to perform the functions discussed herein. The processor device 604 can be connected to a communications infrastructure 606, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 can also include a main memory 608 (e.g., random access memory, read-only memory, etc.), and can also include a secondary memory 610. The secondary memory 610 can include the hard disk drive 612 and a removable storage drive 614, such as a floppy disk drive, a magnetic tape drive, an optical disk drive, a flash memory, etc.

The removable storage drive 614 can read from and/or write to the removable storage unit 618 in a well-known manner. The removable storage unit 618 can include a removable storage media that can be read by and written to by the removable storage drive 614. For example, if the removable storage drive 614 is a floppy disk drive or universal serial bus port, the removable storage unit 618 can be a floppy disk or portable flash drive, respectively. In one embodiment, the removable storage unit 618 can be non-transitory computer readable recording media.

In some embodiments, the secondary memory 610 can include alternative means for allowing computer programs or other instructions to be loaded into the computer system 600, for example, the removable storage unit 622 and an interface 620. Examples of such means can include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 600 can also include a communications interface 624. The communications interface 624 can be configured to allow software and data to be transferred between the computer system 600 and external devices. Exemplary communications interfaces 624 can include a modem, a network interface (e.g., an Ethernet card), a communications port, a PCMCIA slot and card, etc. Software and data transferred via the communications interface 624 can be in the form of signals, which can be electronic, electromagnetic, optical, or other signals as will be apparent to persons having skill in the relevant art. The signals can travel via a communications path 626, which can be configured to carry the signals and can be implemented using wire, cable, fiber optics, a phone line, a cellular phone link, a radio frequency link, etc.

The computer system 600 can further include a display interface 602. The display interface 602 can be configured to allow data to be transferred between the computer system 600 and external display 630. Exemplary display interfaces 602 can include high-definition multimedia interface (HDMI), digital visual interface (DVI), video graphics array (VGA), etc. The display 630 can be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 608 and secondary memory 610, which can be memory semiconductors (e.g., DRAMs, etc.). These computer program products can be means for providing software to the computer system 600. Computer programs (e.g., computer control logic) can be stored in the main memory 608 and/or the secondary memory 610. Computer programs can also be received via the communications interface 624. Such computer programs, when executed, can enable computer system 600 to implement the present methods as discussed herein. In particular, the computer programs, when executed, can enable processor device 604 to implement the methods illustrated by FIGS. 3-5, as discussed herein. Accordingly, such computer programs can represent controllers of the computer system 600. Where the present disclosure is implemented using software, the software can be stored in a computer program product and loaded into the computer system 600 using the removable storage drive 614, interface 620, and hard disk drive 612, or communications interface 624.

The processor device 604 can comprise one or more modules or engines configured to perform the functions of the computer system 600. Each of the modules or engines can be implemented using hardware and, in some instances, can also utilize software, such as corresponding to program code and/or programs stored in the main memory 608 or secondary memory 610. In such instances, program code can be compiled by the processor device 604 (e.g., by a compiling module or engine) prior to execution by the hardware of the computer system 600. For example, the program code can be source code written in a programming language that is translated into a lower level language, such as assembly language or machine code, for execution by the processor device 604 and/or any additional hardware components of the computer system 600. The process of compiling can include the use of lexical analysis, preprocessing, parsing, semantic analysis, syntax-directed translation, code generation, code optimization, and any other techniques that can be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for preventing an unauthorized transaction indicative of scalping. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for preventing an unauthorized transaction indicative of scalping, comprising:
   receiving, by a receiver of a processing server, from a first merchant system, transaction data for a first payment transaction between a consumer and the first merchant system, the transaction data including at least one or more product identifiers associated with one or more products purchased in the first payment transaction and consumer identification data associated with the consumer;
   updating, by a processor of the processing server, a consumer profile stored on a blockchain associated with a blockchain network, by generating a new block for the blockchain that includes a blockchain data entry including at least the one or more product identifiers and a public key of a cryptographic key pair associated with the consumer profile, wherein the consumer profile is associated with the consumer and the consumer profile is identified based on at least the consumer identification data;
   receiving, by the receiver of the processing server, from a second merchant system different from said first merchant system, a transaction message for a second payment transaction between the consumer and the second merchant system, wherein the transaction message includes one or more data values including at least one product identifier included in the one or more product identifiers and at least one consumer data value, and wherein the at least one consumer data value is included in the consumer profile;
   determining, by the processor of the processing server, a suspicion score for the consumer profile associated with the consumer, wherein the suspicion score is above a predetermined threshold value;
   in response to the suspicion score being above the predetermined threshold value, automatically declining, by the processing server, on behalf of the second merchant system, the second payment transaction; and
   transmitting, by a transmitter of the processing server, an authorization response message for the second payment transaction, wherein the authorization response message includes a response code indicative of rejection of the second payment transaction,
   wherein functions of the processing server are performed by on-site interface processors using the blockchain, and wherein the blockchain utilizes self-executable smart contracts to perform said functions.

2. The method of claim 1, wherein the transaction message is transmitted via payment rails.

3. The method of claim 1, wherein
   the transaction message is formatted according to one or more standards, and
   the one or more data values are stored in a plurality of data fields included in the transaction message and specified in the one or more standards.

4. The method of claim 1, wherein
   the transaction message is received from an external computing system, and
   the authorization response is transmitted to the external computing system.

5. The method of claim 1, wherein the suspicion score is indicative of a likelihood of the second payment transaction purchasing a product associated with the one or more product identifiers for scalping.

6. The method of claim 1, wherein the suspicion score is based on a number of product identifiers stored in the consumer profile compared to a predetermined value.

7. The method of claim 1, wherein
   the first payment transaction involves a first merchant of a plurality of merchants, and
   the second payment transaction involves a second merchant of the plurality of merchants.

8. A system for preventing an unauthorized transaction indicative of scalping, comprising:
   a processing server including
      a receiver receiving, from a first merchant system, transaction data for a first payment transaction between a consumer and the first merchant system, the transaction data including at least one or more product identifiers associated with one or more products purchased in the first payment transaction and consumer identification data associated with the consumer,
      a processor updating a consumer profile stored on a blockchain associated with a blockchain network by generating a new block for the blockchain that includes a blockchain data entry including at least the one or more product identifiers and a public key of a cryptographic key pair associated with the consumer profile, wherein the consumer profile is associated with the consumer and wherein the consumer profile is identified based on at least the consumer identification data, and
      a transmitting device, wherein
   the receiver of the processing server receives, from a second merchant system different from said first merchant system, a transaction message for a second payment transaction between the consumer and the second merchant, wherein the transaction message includes one or more data values including at least one product identifier included in the one or more product identifiers and at least one consumer data value, and wherein the at least one consumer data value is included in the consumer profile,
   the processor of the processing server determines a suspicion score for the consumer profile associated with the consumer, wherein the suspicion score is above a predetermined threshold value,
   in response to determining that the suspicion score is above the predetermined threshold value, the processor of the processing server automatically declines, on behalf of the second merchant system, the second payment transaction, and the transmitter of the processing server transmits an authorization response message for the second payment transaction, wherein the authorization response message includes a response code indicative of rejection of the second payment transaction, wherein functions of the processing server are performed by on-site interface processors of merchant systems using the blockchain, and wherein the blockchain utilizes self-executable smart contracts to perform said functions.

9. The system of claim 8, further comprising:

payment rails associated with a payment network, wherein the transaction message is transmitted via the payment rails.

10. The system of claim 8, wherein the transaction message is formatted according to one or more standards, and the one or more data values are stored in a plurality of data fields included in the transaction message and specified in the one or more standards.

11. The system of claim 8, further comprising:

an external computing system, wherein the transaction message is received from the external computing system, and the authorization response is transmitted to the external computing system.

12. The system of claim 8, wherein the suspicion score is indicative of a likelihood of the second payment transaction purchasing a product associated with the one or more product identifiers for scalping.

13. The system of claim 8, wherein the suspicion score is based on a number of product identifiers stored in the consumer profile compared to a predetermined value.

14. The system of claim 8, further comprising:

a plurality of merchants, wherein the first payment transaction involves a first merchant of the plurality of merchants, and the second payment transaction involves a second merchant of the plurality of merchants.

* * * * *